US006481112B1

(12) United States Patent
White

(10) Patent No.: US 6,481,112 B1
(45) Date of Patent: Nov. 19, 2002

(54) TILE FITTING DEVICE

(76) Inventor: David White, 3005 Martel Dr., Dayton, OH (US) 45420

( * ) Notice: Subject to any disclaimer, the term of this patent is extended or adjusted under 35 U.S.C. 154(b) by 0 days.

(21) Appl. No.: 09/946,575

(22) Filed: Sep. 5, 2001

(51) Int. Cl.[7] .................................................. G01B 1/00
(52) U.S. Cl. ......................... 33/527; 33/42; 33/DIG. 20
(58) Field of Search ................................ 33/32.1, 32.2, 33/42, 526, 527, DIG. 20

(56) References Cited

U.S. PATENT DOCUMENTS 1,619,091 A * 3/1927 Rieser .................... 33/DIG. 20
2,144,697 A * 1/1939 Zangrando ................... 33/527
2,473,639 A * 6/1949 Erickson ........................ 33/42
2,642,647 A * 6/1953 Schell, Jr. .................... 33/527
3,548,505 A 12/1970 Di Candilo .................. 33/527
3,611,579 A 10/1971 Reid ........................... 33/527
3,643,335 A * 2/1972 Smith ............................ 33/42
4,899,455 A * 2/1990 Bovino et al. ................ 33/527
5,471,758 A * 12/1995 White, Sr. ................... 33/527
6,112,424 A * 9/2000 Friend ................... 33/DIG. 20
6,195,904 B1 3/2001 Greer .......................... 33/527
6,412,185 B1 * 7/2002 Mills et al. ................... 33/526

* cited by examiner

*Primary Examiner*—G. Bradley Bennett
(74) *Attorney, Agent, or Firm*—R. William Graham

(57) ABSTRACT

A tile fitting device is provided for use in marking and cutting a loose tile of a predetermined size to be marked to permit it to be laid on a narrow untiled floor space disposed between an upright wall surface and confronting outer edge of a plurality of like laid tile of a predetermined size on a contiguous tiled floor space.

15 Claims, 3 Drawing Sheets

TILE FITTING DEVICE

BACKGROUND OF THE INVENTION

1. Field of Invention

The present invention relates to the art of laying floor tiles, and more particularly, the present invention relates to a device which is useful in fitting tiles to be laid on a narrow floor space along a wall.

2. Related Art

In laying floor tiles it is sometimes necessary to cut and lay a series of tiles on a relatively narrow floor space extending along a wall or other obstruction. At present, there are a number of devices for marking or cutting a loose tile to be fit in the narrow floor space. However, the previously designed devices are not designed to hold multiple tiles enabling its user to more speedily complete the job. Previous designs fail to trace the part of the wall immediately joining the floor. Previous devices trace along a part of the wall different from the part which the tile will actually be resting up against. Often times, especially in older structures, there are significant differences between the portion of the wall immediately adjoining the floor and the portion of the wall just above that portion.

In addition to not being able to hold a plurality of loose tiles to be laid, the single tile which previously designed tile marking/cutting devices did hold was often not guided by side portions. Therefore, the user would have to take time to be careful to properly align the tile to be marked or cut. Also, the means of gauging the narrow floor space to be fitted with a tile would lack any guidance, allowing the user to mark or cut a tile based on a portion a wall not representative of the space being measured. In other words, when the gauging means is not guided, the user is able to trace along a portion of the wall which is not directly before the tile marking/cutting device and the narrow space to be measured. Therefore, the more inexperienced the user, the greater the likelihood of error.

SUMMARY OF THE INVENTION

It is an object of the present invention to provide a tile fitting tool which may be used for quickly and accurately fitting tiles to be laid on a relatively narrow floor space along a wall or like obstruction.

It is another object of the present invention to provide a simple and inexpensive tile fitting tool which may assist inexperienced persons in fitting floor tiles.

Accordingly, the present invention is directed to tile fitting device for use in marking or cutting a tile to permit it to be laid on a narrow untiled floor space disposed between an upright wall surface and confronting outer edge of a plurality of like laid tile on a contiguous tiled floor space. The tile fitting device includes a base and a measuring aid. The base is able to hold a plurality of the tiles, having a bottom portion for resting on the laid tile, a down-turned lip for engaging the outer edge of the laid tile, an upturned lip parallel with the down-turned lip and spaced approximately a tile length therefrom for engaging an edge of the loose tile to be laid, and at least two side walls positioned at right angles to the upturned lip and upwardly extending from the bottom portion, parallel with each other. The tile to be marked is positioned between the side walls and the upturned lip such that the tile rests against the upturned lip and at least one side wall such that at least one side wall extends at a height slightly above the tile to be marked;

The measuring aid provides an edge for use in marking the tile to be marked. The measuring aid includes a central portion for holding the measuring aid, a wall tracing portion generally perpendicularly attached to the central portion, and a tile marking portion generally perpendicularly attached to the central portion, parallel to the wall tracing portion. The down-turned lip of the wall tracing portion rests on the floor and against the wall surface, and the tile marking portion rests on the tile to be marked such that the central portion does not touch the tile to be marked. The tile marking portion, when resting on the tile to be marked, is substantially parallel with the upturned lip. The tile marking portion has sufficient space to move between the side walls of the base such that a user of the device may use a marking utensil to trace along the tile marking portion to make a mark on the tile. The portion of the tile between the mark and the upturned lip of the base will be substantially the exact dimension of the narrow untiled floor space disposed between the upright wall surface and the confronting outer edge of the laid tile, even when the narrow untiled floor space is asymmetrical.

TERMINOLOGY

"Cut" is to cut completely through or to score an object.

DETAILED DESCRIPTION

Figure 1:
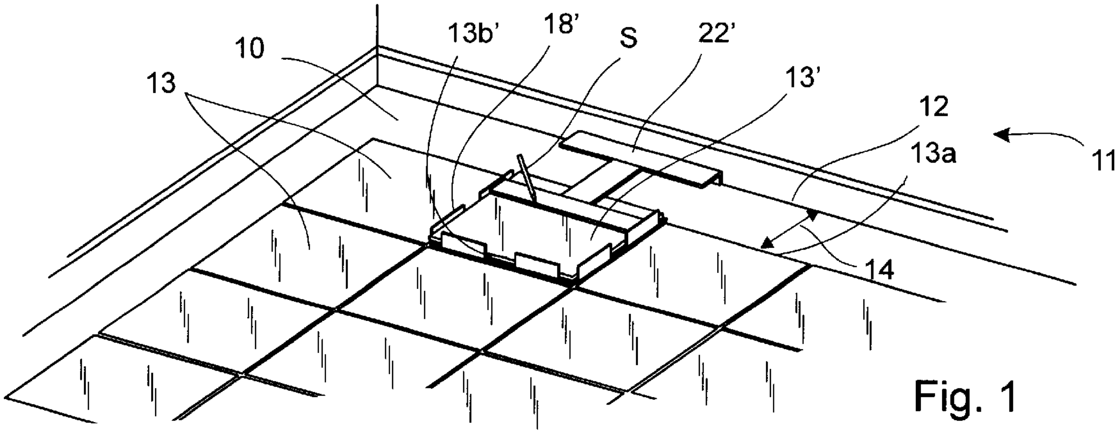
FIG. 1 is a fragmentary perspective view of a partially tiled floor on which the present invention is shown being used to gauge a loose tile prior to its being cut and laid on an untiled portion of the floor space.

The present invention is directed to a tile fitting device 18 for use in marking or cutting a tile 13 to permit it to be laid on a narrow untiled floor space 14. Illustrated in FIG. 1 is a room having a floor 10, a wall 11, and a baseboard 12 projecting upwardly from the floor 10 and extending along the wall 11. A plurality of square tiles 13, laid on substantially the entire floor area 10 define a relatively narrow untiled floor space 14 between their outer edges 13*a*, and the base board 12 (see FIG. 3). The tiles 13 are permanently bonded to the floor 10 by a suitable adhesive 15 which is exposed in the untiled area 14 before loose tiles 13*b* are laid thereon.

Figure 2A:
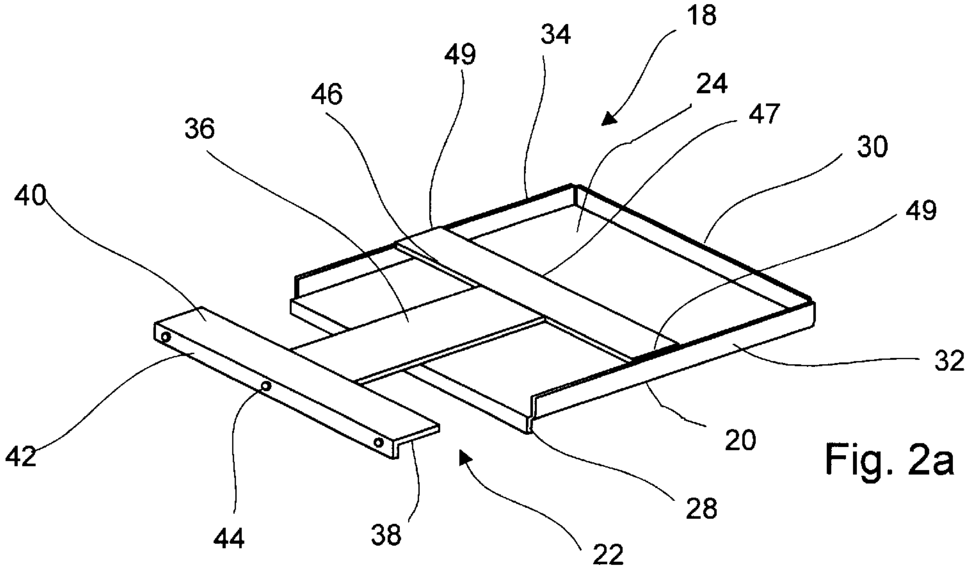
FIG. 2*a* is a perspective view of an embodiment of a tile fitting device
Figure 2B:
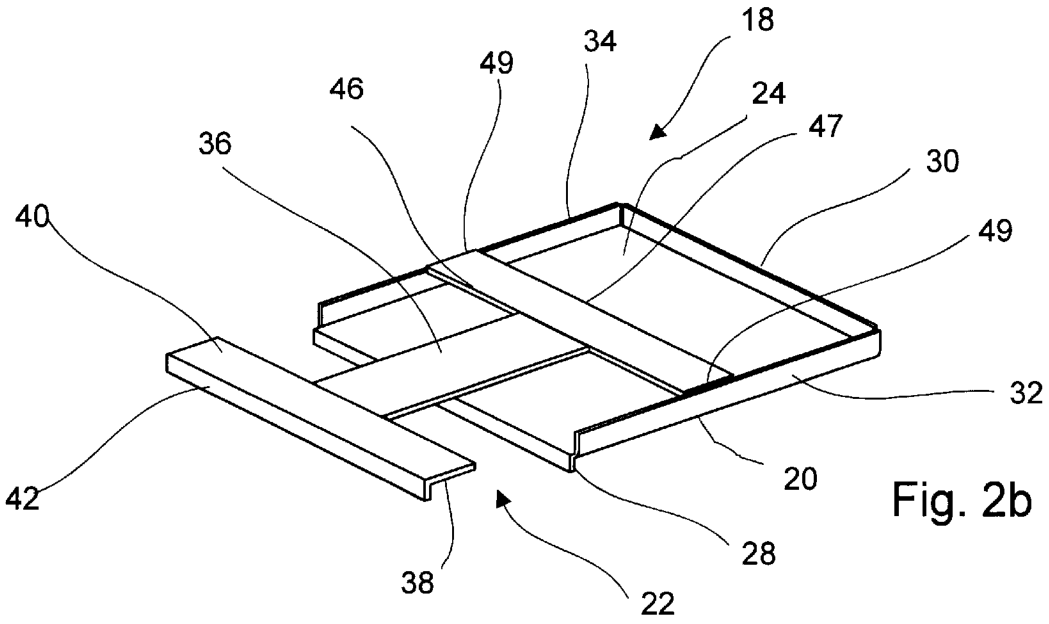
FIG. 2*b* is a perspective view of another embodiment of a tile the tile fitting device
Figure 4:
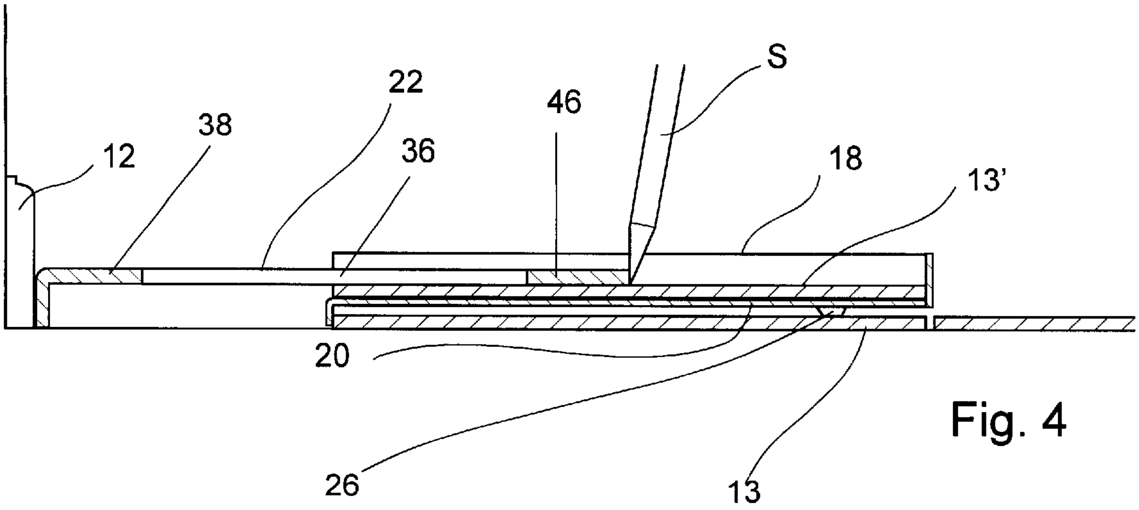
FIG. 4 is a cross sectional view of the invention.
Figure 5:
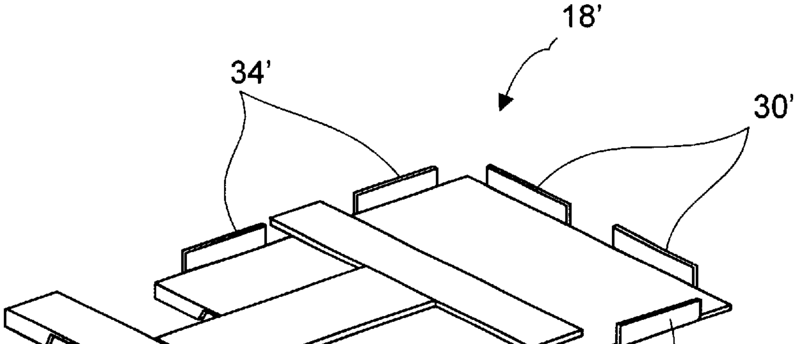
FIG. 5 is a perspective view of the embodiment shown in FIG. 1.

As illustrated in FIGS. 2*a* and 2*b*, the tile fitting device 18 includes a base 20 and a measuring aid 22. The base 20 includes a planar bottom portion 24 for resting on the previously laid tiles 13. It should be understood, however, that the bottom portion 24 may also contain projections 26 which are made of a material which does not scratch the finish of the previously laid tiles 13 (see FIG. 4). One or more of the projections may also be able to roll. Through experimentation, it has been learned that the embodiment in FIG. 4 shows the use two projections 26 on the base 20. The base 20 also includes a down-turned lip 28 for engaging the outer edge 13*a* of the previously laid tiles 13. The lip 28 may be of a predetermined dimension for particular types of tile (e.g., ceramic, linoleum, etc.) or of a common or unique dimension of a particular type of tile. It is understood that the lip 28 may also be modified to be adjustable. The lip 28 of the tile fitting device 18 can be continuous, it is understood that the lip 28' may also be noncontinuous (see FIG. 5).

The base 20 also includes an upturned lip 30 for engaging an outer edge 13*b*' of a loose tile 13' to be marked or cut. Upturned lip 30 runs parallel to down-turned lip 28, and is spaced about one tile length therefrom extending at a generally right angle from the base 20, while down-turned lip 28 extends at a generally right angle from the base in an opposite direction. It is understood that the lip 30 may also be modified to be adjustable. Though the lip 30 of the present invention 18 is continuous, it is understood that the lip 30' may also be noncontinuous (see FIG. 5).

The base 20 also includes a first side wall 32 and a second side wall 34. As illustrated in FIG. 2 the side walls 32 and 34 extend from base 20 at right angles, running parallel to one another. The side walls 32 and 34 are also connected to and the same height as the upturned lip 30. However, the side walls 32 and 34 may be lower or higher than upturned lip 30. Also, side walls 32 and 34 may be different heights from one another. It is understood that side walls 32 and 34 may also be modified to be adjustable. Though side walls 32 and 34 of the present invention 18 are shown continuous, it is understood that side walls 32' and 34' may also be noncontinuous (see FIG. 5).

The measuring aid 22 of the invention 18 includes a central portion 36 for holding the measuring aid 22. The central portion 36 may include projections, indentations, openings, contours, etc. for enhancing the user's ability to manipulate the 22.

Figure 3A:
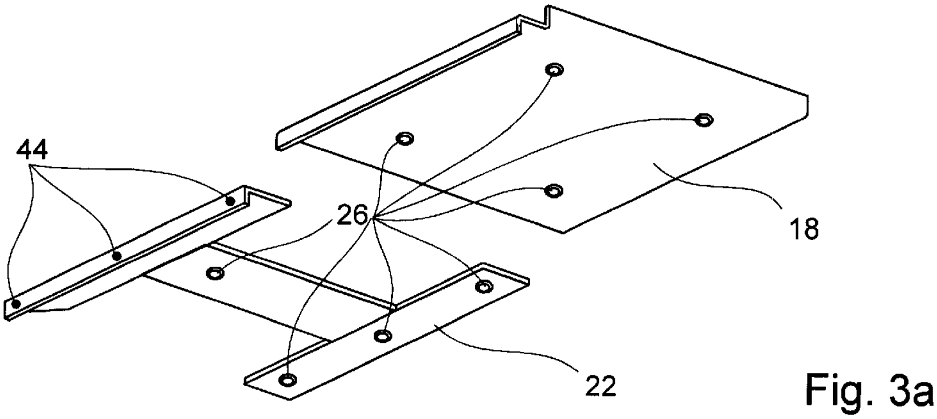
FIG. 3*a* is another perspective view of the embodiment of FIG. 2*a*.
Figure 3B:
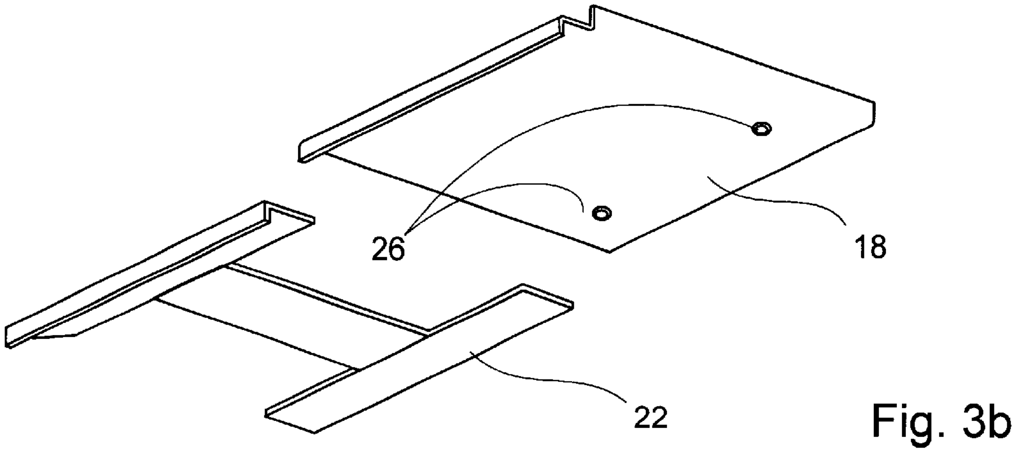
FIG. 3*b* is another perspective view of an embodiment of FIG. 3*a*.

The measuring aid 22 also includes a wall tracing portion 38 perpendicularly attached to the central portion 36. The wall tracing portion 38 is attached to the central portion 36 by a spine 40 from which a down-turned lip 42 extends at a right angle. As illustrated in FIG. 3*a*, the down-turned lip may optionally have projections 44 extending therefrom, made of a material which does not scratch the finish of the baseboard 12 or wall 11. It is understood that the down-turned lip 42 may also be modified to be adjustable. It is also contemplated that the projections 44 or some alternative spacing device can be inserted to account for additional spacing requirements, such as grout. Though the down-turned lip 42 of the present invention 18 is continuous, it is understood that the down-turned lip 42' may also be non-continuous (see FIG. 5).

The measuring aid 22 further includes a tile marking portion 46 perpendicularly attached to the central portion 36, substantially parallel to the wall tracing portion 38. The tile marking portion 46 is planar and rectangular in shape, at a length just less than the distance between side wall 32 and 34. The width of the tile marking portion 46 is predetermined to allow for a predetermined amount of movement of the tile marking portion 46 between side wall 32 and 34. It should be understood that the rectangular shaped edges 49 of the tile marking portion 46, for instance, may alternatively be rounded.

Preferably, the tile fitting device 18 is placed onto the previously laid tiles 13 so that the down-turned lip 28 of the base 20 lays immediately adjacent to their outer edge 13*a* so that the bottom portion 24 lays on top of the previously laid tiles 13. Depending on the pattern of the previously laid tiles 13, the bottom portion may fit precisely over a single previously laid tile 13 or may rest upon a plurality of previously laid tiles 13. One or more loose tiles 13' are positioned between the side walls 32 and 34 such that the loose tiles 13' are immediately adjacent to at least one side wall, while also being immediately adjacent to the upturned lip 30. It is important to note that the total height of the loose tiles 13' as they rest on the base 20, between the side walls 32 and 34 and the upturned lip 30 should preferably not exceed the height of the upturned lip 30, and should be somewhat below the height of the side walls 32 and 34 for the reason that the side walls act to guide not only the loose tiles 13', but also the tile marking portion 46 of the measuring aid 22.

The measuring aid 22 is positioned between the wall 11, baseboard 12, or other structure/surface which is immediately in relation to the narrow untiled floor space 14 and the base 20 such that, as illustrated in FIG. 1, the down-turned lip 42 is placed immediately adjacent the baseboard 12, resting on the floor 10 immediately adjoining the wall 11. The tile marking portion 46 is positioned to rest on the loose tiles 13', between the side walls 34 and 34 such that the area of the loose tile 13' between the tile marking portion 46 and the upturned lip 30 is substantially the area of the narrow untiled floor space 14 being measured. As previously mentioned, in the case that the baseboard 12 is not parallel with the previously laid tiles 13, the slight "play" between the side walls 32 and 34 and the tile marking portion 46 allows the user to follow the line of the baseboard 12 with the wall tracing portion 38 while staying in the confines of the side walls 32 and 34 with the tile marking portion 46. Should the tile marking portion 46 be modified to include rounded edges, as previously mentioned, the marking/cutting edge 47 may have some play between the side walls 32 and 34. The result of a longer marking/cutting edge 47, the less need there is for the user to "free-hand" the mark or cut.

Upon positioning the tile fitting device 18 between a baseboard 12 and previously laid tiles 13 to measure a narrow untiled floor space 14, the user may then mark along the tile marking portion 46 closest to the upturned lip 30 with a marking utensil (e.g., pen, pencil, marker, chalk, etc.,). The user may then remove the loose tile 13*b* that has been marked to make the appropriate cut. Removal of the loose tile 30 to make the cut would be common practice for tiles made from harder material such as stone, ceramic, marble, etc.

The user may, in place of marking the loose tile 13*b*, use a cutting utensil (e.g., utility knife, pen knife, razor blade, etc.) to score or cut the loose tile 13' along the tile marking portion 46 closest to the upturned lip 30. Scoring or cutting the loose tile 13' while between the side walls 32 and 34 would be common practice for tiles made from softer materials such as linoleum, cork, rubber, etc. In the case that the user wishes to cut completely through a loose tile 13', while the loose tile 13' is on at least one other loose tile 13', a pad or plate may be positioned there between to avoid damaging the loose tile 13' underneath.

Upon cutting the loose tile 13*b*, the user may slide the tile fitting device along the previously laid tiles 13, placing the loose tile 13' into the narrow untiled floor space 14. The measuring aid 22 may also be slid along the baseboard 12 and floor 10. In most cases, after removal of the first cut loose tile 13', and removal thereof, a second loose tile 13' will be immediately underneath, ready for the process to be repeated.

The tile fitting device 18 may be made of metal or plastic, or a combination of both. For instance, if the measuring aid 22 was made of plastic, the tile marking portion 46, or at least a portion thereof, might include at least a portion of metal surface for purposes of durability against repeated scoring or cutting of loose tiles 13'.

While the present invention has been described in connection with the illustrated embodiments, it will be appreciated and understood that modification may be made without departing from the true spirit and scope of the invention.

What is claimed is:

1. A tile fitting device for use in one of marking and cutting a loose tile of a predetermined size to be marked to permit it to be cut and laid on a narrow untiled floor space disposed between an upright wall surface and confronting outer edge of a plurality of like laid tile of a predetermined size on a contiguous tiled floor space, said tile fitting device comprising:

a base for holding at least one tile, said base comprising:

a bottom portion for resting on the laid tile;

a down-turned lip connected to said bottom portion for engaging the outer edge of the laid tile;

an upturned lip generally parallel with said down-turned lip and spaced therefrom for engaging an edge of the loose tile; and at least one side wall positioned at a predetermined angle to said upturned lip;

wherein said loose tile is positioned between said side walls and said upturned lip such that said loose tile rests against said upturned lip and at least one side wall such that said at least one side wall extends at a height slightly greater than said tile to be marked;

an aid for measuring said loose tile, saidmeasuring aid comprising:

a central portion for holding;

a wall tracing portion generally perpendicularly attached to said central portion; and a tile marking portion generally perpendicularly attached to said central portion, parallel to said wall tracing portion;

wherein said down-turned lip of said wall tracing portion rests on said floor and against said wall surface, and said tile marking portion rests on said loose tile; and wherein said tile marking portion, when resting on said loose tile, is substantially parallel with said upturned lip, said tile marking portion having sufficient space to move between said side walls of said base such that a user of said tile fitting device may use one of a marking utensil and cutting utensil along said tile marking portion to enable a cut of the loose tile when said down-turned lip rests against the outer edge of the laid tile and said tile marking portion rests against said wall such that a portion of the tile between said tile marking portion and said upturned lip is substantially the dimension of said narrow untiled floor space disposed between the upright wall surface and the confronting outer edge of the laid tile.

2. The tile fitting device of claim 1, wherein said tile marking portion has a substantially linear surface.

3. The tile fitting device of claim 2, wherein said tile marking portion rests substantially flush on said loose tile.

4. The tile fitting device of claim 1, wherein said base includes two side walls.

5. The tile fitting device of claim 4, wherein said side walls are positioned at right angles to said upturned lip.

6. The tile fitting device of claim 1, wherein said side walls are parallel to one another.

7. The tile fitting device of claim 1, wherein said side walls are continuous.

8. The tile fitting device of claim 1, wherein said side walls are noncontinuous.

9. The tile fitting device of claim 1, wherein said central portion includes a handle which can be gripped by one hand of a user to position said measuring aid.

10. The tile fitting device of claim 1, wherein said wall tracing portion contains projections for resting against said wall for substantially prevent damage thereto.

11. The wall tracing portion of claim 10, wherein said projections are capable of rolling.

12. The tile fitting device of claim 1, wherein said tile marking portion contains projections for resting against said loose tile for substantially preventing damage thereto.

13. The tile marking portion of claim 12, wherein said projections are capable of movement across tile surface without damage thereto.

14. The tile fitting device of claim 1, wherein bottom portion of said base contains projections for resting against said laid tiles for substantially preventing marks to said laid tiles.

15. The bottom portion of claim 14, wherein said projections are capable of movement across the tile surface without damage thereto.

* * * * *